UNITED STATES PATENT OFFICE.

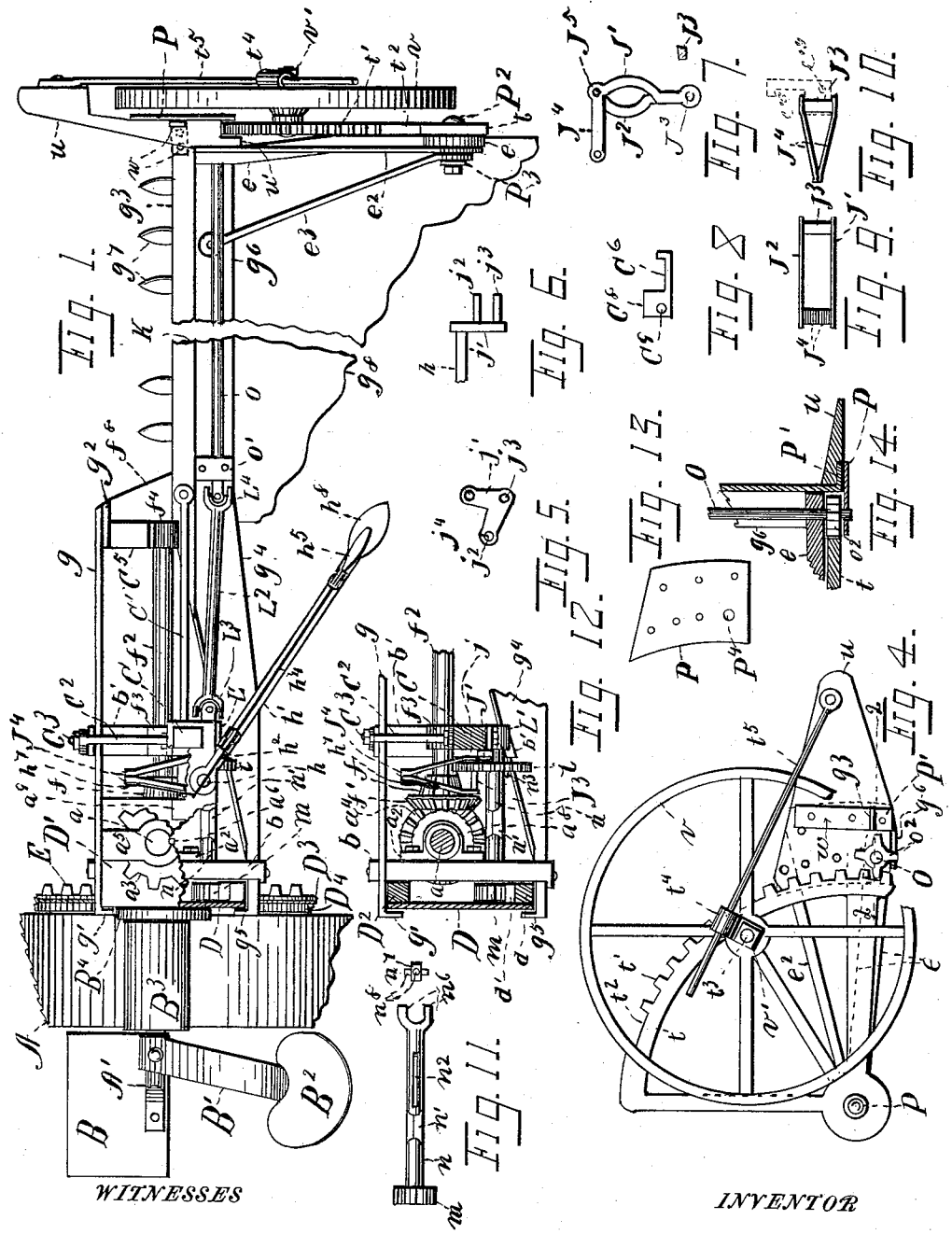

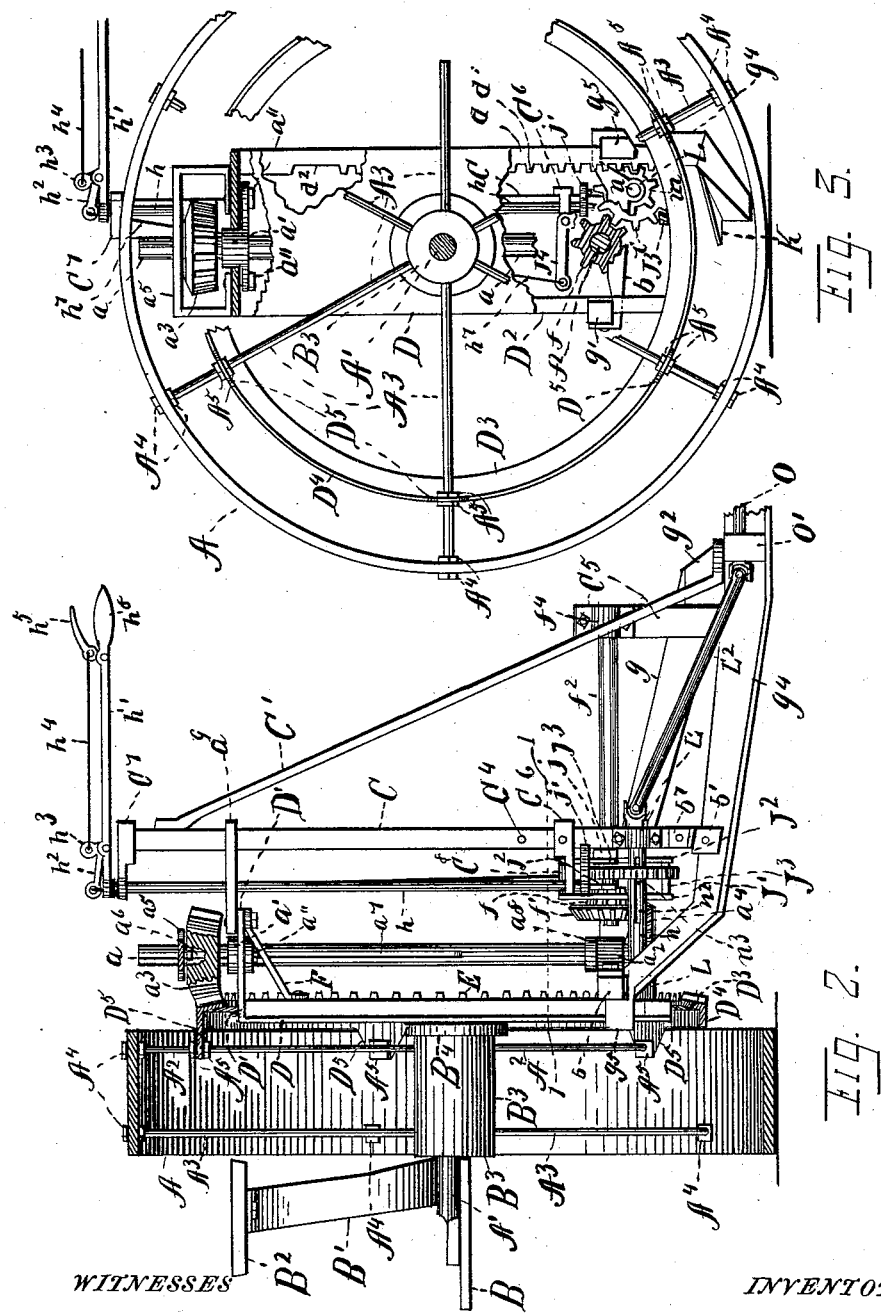

GEORGE SCHUBERT, OF WALNUT, TEXAS.

RAISING AND LOWERING MECHANISM FOR HARVESTERS.

SPECIFICATION forming part of Letters Patent No. 478,717, dated July 12, 1892.

Application filed April 11, 1891. Serial No. 388,613. (No model.)

*To all whom it may concern:*

Be it known that I, GEORGE SCHUBERT, a citizen of the United States, residing at Walnut, in the county of Bosque and State of Texas, have invented a new and useful Raising and Lowering Mechanism for Harvesters, of which the following is a specification.

My present invention relates to improvements in a raising and lowering mechanism for harvesters and binders, in which both ends of the machine are simultaneously raised or lowered; and the objects of my improvements are to construct shafting and gearing so that a gearing to elevate the machine can be engaged with or disengaged from constantly-rotating gearing, so that the machine is elevated by power received from the drive-wheel, and a brake so arranged that the machine can be lowered to any desired level at once, and to construct such mechanism so as to be simple, light, inexpensive, and durable. The mechanism can be employed to elevate the machine over low obstructions while in operation. Heretofore it has been the practice to drive around such obstructions, which always produced waste of grain and loss of time. I attain these objects by the mechanism illustrated in the accompanying drawings, in which—

Figure 1 is a top plan view of a harvester provided with my improvements with certain parts broken away. Fig. 2 is a rear view of the inner or left-hand portion of the device shown in Fig. 1 with the master-wheel and the toothed rim shown in section. Fig. 3 is an end view of the device shown in Fig. 1, looking grainward, with the master-wheel partly broken away and the lower end of the vertical plate also broken away. Fig. 4 is a view of the grain end of the machine with the plate P in dotted lines. Figs. 5 and 6 are detail views of the shifting and braking lever or bell-crank. Fig. 7 is a side view of the locking-dog. Fig. 8 is a view of the bracket to which the locking-dog is pivoted. Figs. 9 and 10 are different views of the locking-dog. Fig. 11 is a detail view of the main raising and lowering shaft $n$, provided with the pinion $m$. Fig. 12 is a sectional view on line 1 1, Fig. 2, with the bell-crank and certain other parts removed, showing the lower parts of the mechanism. Fig. 13 is a view of the plate P, and Fig. 14 is a sectional view on line 2 2 of Fig. 4.

Referring to the drawings, A designates the master-wheel; A′, its axle, upon which the master-wheel A rotates. To the outer end of said axle A′ is secured a foot-board B and a seat-spring B′, having to its upper end secured the seat B². (See Figs. 1 and 2.)

B³ designates the hub of the master-wheel A, to which the inner ends of the spokes A² and A³ are secured, with their outer ends secured to the rim of the master-wheel A by the nuts A⁴. The grain end of the axle A′ projects through the hub B³ just far enough to receive the washer B⁴ and the plate D, to which it is firmly secured, the washer B⁴ being riveted to the plate D, so that said plate D can be more firmly secured to the axle A′. The upper end of the plate D is turned at a right angle to a horizontal position, (see Fig. 2,) forming the projection D′, which is braced by the brace F. Said projection D′ is perforated to receive the shaft $a$ and the upper edge of the bearing $a'$ and provided with a bracket $a^9$, cut out or perforated to allow the rods $h$ and $h^7$ to operate and perforated to receive the post C, and has a vertical movement on said post C, forming a guide on said post to prevent the machine from rocking on the plate D. The front vertical edge of the plate D is provided with a bar D², riveted to said plate D to strengthen the plate D. To the rear edge of said plate is riveted the rack $d$, also strengthening the plate D. Said rack is provided with cogs $d'$, projecting forward, and a blank $d^2$ near the upper end of said rack. (See Fig. 3.)

K designates the finger-bar, known as a "double-angle" or "Z" bar, with the lower flange $g^6$ extending to the rear and the upper flange $g^3$ projecting to the front and provided with the usual guard-fingers $g^7$. The bottom plate $g^8$ is riveted to the lower flange $g^6$ and provided with a lug P³ to receive the bolt P².

$f^8$ indicates the usual inner shoe, provided with a vertical flange $g^2$ on its forward projecting end. To said shoe $f^8$ and vertical flange $g^2$ is secured the post C⁵ in a vertical position, for the purpose hereinafter mentioned, and to the outer side of the said vertical flange $g^2$ is secured at one end the bar $g$, with its other end extending to the front edge of the plate D and turned at right angles at $g'$ to receive said plate D.

$g^4$ is an extension of the finger-bar K, extending, also, to the plate D, and turned at a right angle forward at $g^5$ to receive the said plate D.

$b$ is a cross-bar extending from bar $g$ to bar $g^4$, with its front end below the bar $g$ and its rear end above the bar $g^4$ and rigidly secured to said bars $g$ and $g^4$ adjacent the rack $d$ and the bar $D^2$, and it prevents the plate D from disengaging the said bars $g$ and $g^4$ or having any lateral movement thereon. Said bars $g$ and $g^4$ have a vertical movement on said plate D, as hereinafter described.

$b'$ is another cross-bar extending from the bar $g^4$ to the bar $g$ and rigidly secured thereto a short distance grainward from the bar $b$, so as to provide room for the gearing hereinafter described. To said cross-bar $b'$ is secured at its lower end the post C, extending upward slightly higher than the master-wheel A and braced in position by the brace $C'$, secured to near the top of the post C and to the finger-bar K just in rear of the shoe $f^8$, and a short brace $C^2$, secured to the bolt $C^3$, by which the cross-bar $b'$ is secured to the bar $g$ and extending to the bolt $C^4$ on the post C. (See Figs. 1 and 2.)

$D^3$ designates a bevel gear-wheel or toothed rim without the usual central portion. Said toothed rim $D^3$ is provided with a lateral flange $D^4$ and lugs $D^5$, which are extensions of the lateral flange $D^4$. By said lugs $D^5$ the toothed rim is secured to the spokes $A^2$ of the master-wheel A by the nuts $A^5$. Said rim $D^3$ is made less in diameter than the master-wheel A, so as to prevent its cogs E from coming in contact with the ground. Said rim $D^3$ projects laterally from the side of the master-wheel A a suitable distance and projects beyond the plate D for its cogs E to engage with the bevel-pinion $a^3$. The length of the plate D, rack $d$, and bar $D^2$ is less than the inside diameter of the rim $D^3$, so that said rim can rotate around said plate D without coming in contact with the same.

$a$ designates a shaft in a vertical position and provided at its upper end with a bearing $a'$, secured to the projection $D'$ and projecting partly in a perforation in the said projection $D'$, with a bearing $a^2$ near its lower end secured to the cross-bar $b$ and a bevel-pinion $a^4$ on its lower end and a collar $a^8$ above the bearing $a^2$ to prevent its downward movement and the bevel-pinion $a^3$ near its upper end in mesh with the toothed rim $D^3$. Said bevel-pinion $a^3$ is provided with a key $a^6$, and the shaft $a$ is provided with a key-bed $a^7$ the greater part of its length, and said shaft $a$ has a vertical movement through the bearing $a'$ and bevel-pinion $a^3$ for the purpose hereinafter stated. $a^5$ is a bracket extending over the bevel-pinion $a^3$, with its ends turned down and then inward, so as to receive the bolts $a''$, by which the bearing $a'$ is secured, and prevents the bevel-pinion from working upward.

$f^2$ designates a shaft placed in a horizontal position and parallel with the finger-bar K, with a bearing $f^4$ at its grain end secured to the post $C^5$ and a bearing $f^3$ near its other end secured to the post C and provided with a bevel-pinion $f'$ at its stubbleward end. Said bevel-pinion $f'$ is in mesh with bevel-pinion $a^4$ and provided with cogs $f$ on its grainward side, as shown in Figs. 1 and 3. In Fig. 3 the bevel-pinion $f'$ is broken away and the cogs $f$ and shaft $f^2$ are shown in section. The front edge of the finger-bar is located on line with the center of the master-wheel, and the post $C^5$ is placed in front of the shaft $f^2$ on the shoe $f^8$, and the post C is placed to the rear of said shaft $f^2$. The bearings $f^3$ and $f^4$ are located on said posts C and $C^5$, respectively, at a suitable height from the bar $g^4$, so as to bring the shaft $f^2$ to a level, while the bevel-pinion $f'$ is in proper mesh with the bevel-pinion $a^4$.

$n$ indicates a shaft revolving in a bearing L near its inner end, with its end projecting through said bearing and provided with a pinion $m$ on said projecting end in position to engage with the cogs $d'$ on the rack $d$. Said shaft also revolves in a bearing $L'$ near its other end, secured to the post C near its lower end, and its end is connected by a universal joint to the shaft $L^2$. Said shaft $n$ is provided with a key-seat $n^2$, extending from the bearing $L'$ stubbleward for five or six inches and is squared at $n'$ near its center, by which said shaft can be turned and the machine elevated by means of a wrench while the machine is at rest.

$i$ is a pinion provided with a key $n^3$ and located on the shaft $n$, with the key $n^3$ engaging the key-seat $n^2$, and is located between the post C and the bevel-pinion $a^4$ in position to be engaged with or disengaged from the cogs $f$ for the purpose hereinafter described.

$h$ designates a rod extending through the bracket $C^7$, secured to the upper end of the post C and provided with a lever $h'$ on the upper end of the rod $h$, so as to rest on the bracket $C^7$. Said lever is provided with a handle $h^8$ and a thumb-latch $h^5$ and a bell-crank pivoted to near the inner end of the lever, with its longer end $h^2$ projecting toward the inner end of said lever $h'$ and connected with its shorter end $h^3$ to the thumb-latch by the rod $h^4$. Said rod $h$ extends with its lower end through the bracket $C^6$ just far enough to receive the bell-crank or shifting lever $j'$, projecting toward the rear, with its studs $j^2$ and $j^3$ projecting downward on each side of the pinion $i$, one side being cut out at $j^4$, (see Fig. 5,) so as to not come in contact with the post C. The studs $j^2$ and $j^3$ can be readily replaced by new ones as they wear out. The bracket $C^6$ (see Figs. 2 and 8) is secured to the post C, projecting stubbleward and provided with an eye $C^9$ to receive the rod $h$ and a projection $C^8$ projecting forward, and to said forward projection $C^8$ is pivoted the locking-dog $J^5$, extending downward with the arm $J'$ near the bevel-pinion $f'$ and the arm $J^2$ near the post C, with their lower ends connected by a bar $J^3$ to engage with the cogs on the pinion $i$. The other arms $J^4$ $J^4$ of the dog $J^5$ project forward in a horizontal position and are connected at their free ends. To said ends is secured the lower end of the rod $h^7$, with its upper end connected to the arm $h^2$ of the bellcrank. The arm $J'$ of the locking-dog is curved rearward, so as to clear the cogs $f$, while the arm $J^2$, is curved forward so as to clear the block $j$. Said block $j$ is a brake-block secured to the post C below the bracket $C^6$ and on the side next to the pinion $i$, as shown in Fig. 2. Said block can be readily replaced by a new one as it wears away. The bar $J^3$ is flat on its upper side and beveled on its lower and rear side, (see Fig. 7,) so as to allow the pinion $i$ to rotate forward, but will readily engage with the cogs of the said pinion $i$ on the rearward movement of the same.

O indicates a shaft located on the rear and lower flange $g^6$ of the finger-bar K, journaled near its outer end in the bar $e$, secured to the flange $g^6$, with an additional support at the extreme grainward end, consisting of the plate P, hereinafter described, and a bearing $o'$ near its other end secured to the flange $g^6$. Said shaft is provided with a pinion $o^2$ near its outer or grain end in position to engage with the segment hereinafter described, and its inner end is connected to the shaft $n$ by the shaft $L^2$ and universal joints $L^3$ and $L^4$. The bar $e$ is secured to the flange $g^6$ near the outer end of the finger-bar K and extends to the rear far enough beyond the center of the segment $t$ to receive the bolt $P^2$, and is braced in position by the brace $e^3$, secured to its rear end and to the flange $g^6$, and a brace $e^2$, extending from its rear end to the upper part of the grain-board $u$. To the rear end of said bar $e$ and on the bolt $P^2$ is pivoted the segment $t$, projecting forward and in position to engage with the pinion $o^2$, secured to the shaft O. Said segment $t$ is provided with cogs $t'$ to engage with the pinion $o^2$ and a blank $t^2$. Said blank $t^2$ corresponds with the blank $d^2$ on the rack $d$, and in said blanks $t^2$ and $d^2$ the pinions $o^2$ and $m$ can rotate so as to prevent breaking when the pinion $i$ is not disengaged from the cogs $f$ at the proper time.

$t^3$ is a bolt secured in a perforation in the segment $t$, forming the support or axle for the grain-wheel $v$. $v'$ is a nut on the outer end of said axle $t^3$, prevented from working off by the washer $t^4$, which latter is prevented from rotating by the grain-rod $t^5$ carried by said washer $t^4$. The forward end of said grain-rod $t^5$ is secured to the forward end of the grain-board $u$ by a rivet and has a slight rotary movement on said grain-board, so that its rearward end can be carried higher or lower by the washer $t^4$ as the machine is raised or lowered.

The vertical web of the finger-bar K is left somewhat longer than the horizontal flanges $g^4$ and $g^3$ and is turned forward at right angles, forming the projection P'.

$w$ is a bracket secured to the end of the flange $g^3$, with its outer side flush with the outer side of the projection P'.

$u$ is the usual grain-board secured to the bracket $w$ and extending to the segment $t$, with the inner edge $u'$ projecting past the edge of said segment $t$, and the plate P is secured to the outer side of the bracket $w$ and the projection P' and the grain-board $u$, with its rear edge projecting past the front and outer edge of the segment $t$. The outer or grain end of the shaft O extends in the perforation $P^4$ to find an additional support in the plate P. Said plate P is shown in position in dotted lines in Fig. 4 and in a separate view in Fig. 13. The shaft $n$ is bifurcated at its grainward end, forming the prongs $n^6$ to receive the block $n^7$ by two of its studs $n^8$, with the shaft $L^2$ also bifurcated and connected or pivoted to studs of said block $n^7$, forming the well-known universal joint $L^3$, which will be readily understood.

The operation is as follows: The shaft $f^2$, carrying the bevel-pinion $f'$, provided with the cogs $f$, receives its motion from the bevel-pinion $a^4$, carried by the shaft $a$, through the bevel-pinion $a^3$, being in mesh with the toothed rim D. The shaft $f^2$ is thus constantly rotated in one direction while the machine is in motion. When the operator desires to elevate the machine while in motion, he grasps the handle $h^8$ of lever $h'$ and draws it toward himself, thereby shifting the pinion $i$ on shaft $n$ in the same direction by the stud $j^2$, thus engaging said pinion with the cogs $f$, by which the pinion $i$ will be rotated, and thus rotate the shaft $n$, and it in turn rotates the shaft O by means of the shaft $L^2$ and universal joints $L^3$ and $L^4$, and the pinion $o^2$ on the shaft O being in mesh with the segment $t$ and the pinion $m$ in mesh with the rack $d$ will cause the machine to elevate. When the machine is thus elevated to the desired height, the operator grasps the handle or lever $h'$ again and shifts the same back in position again, as seen in Fig. 1, thereby disengaging the pinion $i$ from the cogs $f$ by the stud $j^3$, and the bar $J^3$, engaging with the cogs of the pinion $i$, will prevent its backward rotation. Thus the machine will remain in the elevated position. When the operator desires to lower the machine, he grasps the handle $h^8$ and presses the lever $h'$ grainward, thereby pressing the pinion $i$ against the block $j$ by the stud $j^3$, when he will close the thumblatch $h^5$, thereby disengaging the bar $J^3$ from the cogs of the pinion $i$, when he will loose the lever $h'$ sufficiently to allow the pinion to rotate backward, and thus allow the machine to lower. When the machine is thus lowered to the desired point, he will release the thumblatch $h^5$ and the bar $J^3$ will again engage with the pinion $i$ by reason of the weight of the arms $J^4$ $J^4$ and the rod $h^7$, and thus lock the machine again in position.

I am aware that prior to my invention harvesting-machines have been made provided with means to elevate or lower both ends of the machine simultaneously. I therefore do not claim such a combination, broadly; but What I do claim, and desire to secure by Letters Patent, is—

1. In a raising and lowering device for binders and harvesters, the combination of a pinion $i$ on the shaft $n$ in position to be engaged or disengaged with the cogs $f$, in connection with a pinion $m$ on the shaft $n$, a rack $d$, and a shaft O, connected to shaft $n$ by a shaft $L^2$ and universal joints $L^3$ and $L^4$, the shaft O provided with a pinion $o^2$, in connection with a segment $t$, as shown, and for the purpose described.

2. In a raising and lowering device for harvesters, the combination of a shaft $n$, provided with a key-seat $n^2$, a pinion $i$, provided with a key to engage said key-seat $n^2$ and in position to engage or disengage with the cogs $f$, a rod $h$, provided with a lever $h'$ at its upper end and a bell-crank $j'$ at its lower end, provided with the studs $j^2$ and $j^3$, as shown, and for the purpose described, in connection with a dog $J^5$, as shown, a pinion $m$ on the shaft $n$, a rack $d$, and a shaft O, connected to shaft $n$ by the shaft $L^2$ and universal joints $L^3$ and $L^4$, the shaft O provided with a pinion $o^2$ in connection with a segment $t$, as shown, and for the purpose described.

3. In a raising and lowering device for harvesters, a bracket $C^6$, secured to the post C and provided with a forward projection $C^8$ to receive the dog $J^5$, with its horizontal arms $J^4$ $J^4$ projecting forward, with its other arms $J'$ and $J^2$ projecting downward and connected by the bar $J^3$, for the purpose described, in connection with a pinion $i$ on the shaft $n$, a pinion $m$ on the shaft $n$, a rack $d$, a shaft O, connected to the shaft $n$ by a shaft $L^2$ and universal joints $L^3$ and $L^4$, a pinion $o^2$ on said shaft O, and a segment $t$, as shown and described.

4. In a raising and lowering device for harvesters, a bracket $C^6$, secured to the post C, and a locking-dog $J^5$, pivoted to said bracket, a rod $h^7$, secured to the free end of the arms $J^4$ $J^4$ and connected to the arm $h^2$ of the bell-crank, in connection with a rod $h$, provided with a lever $h'$, and a bell-crank $j'$, provided with the stud $j^3$, in connection with a pinion $i$ on a shaft $n$, a pinion $m$ on the shaft $n$, a rack $d$, a shaft O, connected to the shaft $n$ by a shaft $L^2$ and universal joints $L^3$ and $L^4$, a pinion $o^2$ on said shaft O, and a segment $t$, as shown and described.

5. In a raising and lowering device for harvesters, the combination of a finger-bar K, having its vertical web projecting beyond the horizontal flanges and turned forward at P', and a bracket $w$, secured to the horizontal flange $g^3$, and a plate P, secured to said forward projection P' and the bracket $w$ and projecting toward the rear and providing a support for the outer end of shaft O and a guide for the outer side of the segment $t$, as shown.

6. In a raising and lowering device for harvesters, the combination of a finger-bar K, provided with a bracket $w$, a plate P, secured to the bracket $w$, and projecting rearward and providing a support for the outer end of shaft O and forming a guide for the outer side of the segment $t$, a grain-board $u$, secured to said bracket $w$, and the plate P, with its inner edge $u'$ projecting rearward and projecting past the edge of the segment $t$, as shown, and for the purpose described.

7. In a raising and lowering device for harvesters, the combination of a bar $e$, secured to the flange $g^6$ of the finger-bar K and extending to the rear and secured by the braces $e^2$ and $e^3$, and a segment $t$, pivoted to the rear end of the bar $e$ and projecting forward, in connection with a plate P, secured to the bracket $w$ and projecting rearward and past the outer edge of said segment $t$, with the grain-board $u$, provided with a rearward-projecting flange $u'$, projecting past the inner edge of said segment $t$, as and for the purpose described.

8. In a raising and lowering device for harvesters, the combination of the bar $g^4$, extending to the vertical plate D and turned forward at $g^5$, and the bar $g$, extending from the shoe $f^8$ to the plate D and turned rearward at $g'$, and a cross-bar $b$ on the bars $g$ and $g^4$ near the upright plate D, for the purpose described.

9. In a raising and lowering device for harvesters, the combination of a vertical plate D, secured to the axle A of the master-wheel and provided with a rack $d$ and a bar $D^2$, the upper end of said plate D being turned grainward, forming the projection D', a post C, secured in an upright position, as shown, and a bracket $a^9$, secured to the projection D' and forming a guide on the post C, as shown, and for the purpose described.

GEORGE SCHUBERT.

Witnesses:
W. T. HOWELL,
J. F. WOMBLE.